United States Patent [19]

Garrett et al.

[11] Patent Number: 5,985,001
[45] Date of Patent: Nov. 16, 1999

[54] SEPARATION OF A GAS

[75] Inventors: Michael Ernest Garrett, Woking, United Kingdom; Alberto I. LaCava, Guttenberg, N.J.

[73] Assignee: The Boc Group PLC, Windlesham, United Kingdom

[21] Appl. No.: 09/081,005

[22] Filed: May 19, 1998

[30] Foreign Application Priority Data

May 23, 1997 [GB] United Kingdom .................... 9710664

[51] Int. Cl.⁶ .......................... B01D 53/047; B01D 53/26; B01D 51/08
[52] U.S. Cl. ..................................... 95/29; 95/96; 95/117; 95/138; 95/139; 96/122; 96/130; 96/389
[58] Field of Search ................................. 95/29, 96–103, 95/130, 138, 117, 139; 96/108, 122, 130, 389

[56] References Cited

U.S. PATENT DOCUMENTS

| | | | |
|---|---|---|---|
| 4,386,945 | 6/1983 | Gardner | 95/138 X |
| 4,448,592 | 5/1984 | Linde | 96/130 X |
| 4,816,121 | 3/1989 | Keefer | 95/138 X |
| 4,948,401 | 8/1990 | Izumi et al. | 96/130 X |
| 4,968,329 | 11/1990 | Keefer | 96/130 X |
| 5,071,449 | 12/1991 | Sircar | 95/138 X |
| 5,082,473 | 1/1992 | Keefer | 96/130 X |
| 5,096,469 | 3/1992 | Keefer | 96/130 X |
| 5,256,172 | 10/1993 | Keefer | 96/130 X |

FOREIGN PATENT DOCUMENTS 2 174 922  11/1986  United Kingdom .

*Primary Examiner*—Robert Spitzer
*Attorney, Agent, or Firm*—Philip H. Von Neida; Salvatore P. Pace

[57] ABSTRACT

A thermodynamic pressure swing adsorption cycle utilizing "loudspeaker" diaphragms or pistons which are located at the top and bottom of a column containing a bed of adsorbent. The diaphragms are vibrated out of phase with each other so as to provide a displacement wave in the gas mixture within the bed of adsorbent. In addition to this displacement wave the gas is compressed prior to upward displacement and the gas pressure is lowered before the downward displacement by way of a second set of "loudspeakers" which form the side walls of the column. The second set of loudspeakers vibrate in phase with each other and operate at the same frequency as the displacement speakers.

14 Claims, 1 Drawing Sheet

SEPARATION OF A GAS

This invention relates to the separation of a gas mixture. It is particularly concerned with the separation of gas mixtures employing adsorbent material. By appropriate selection of the adsorbent it is known to separate a feed gas mixture into two gas streams, one relatively rich in the more readily adsorbed constituent or constituents of the gas mixture, the other relatively rich in the less readily adsorbed constituent or constituents of the mixture. Typically, one of the gas streams is taken as product and the other stream is vented to the atmosphere. Normally, a plurality of beds is employed, each bed being regenerated in turn.

A large number or processes for the separation of gas mixtures employ adsorbent in such a way. Typically, adsorption takes place at a relatively elevated pressure and the adsorbent is regenerated by subjecting it to a relatively low pressure. Such a mode of operation is attractive in its simplicity, but does involve large losses of energy and of the yield.

If these so called "pressure swing adsorption" processes for separating gas mixtures are analysed thermodynamically it will be seen that they involve the performance of a large quantity of irreversible work.

In order to provide a more thermodynamically efficient system for separating gas using an adsorbent, our British Patent, No. GB-A-2174922 proposed a method of separating a feed gas mixture into a first gaseous fraction and a second gaseous fraction, comprising performing the following steps in repeated sequence:

a) fractionally raising the pressure of a gas mixture which is resident in a bed of adsorbent capable of selectively adsorbing at least one constituent of the feed gas mixture and which comprises the same constituents as said feed gas mixture, and thereby adsorbing said at least one selectively adsorbable constituent;

b) performing a first incremental translation at approximately constant pressure of the unadsorbed gas in one direction;

c) fractionally reducing the pressure of the gas in the bed and thereby desorbing previously adsorbed gas from the adsorbent;

d) performing a second incremental translation at approximately constant pressure of the gas in the bed in a direction opposite to the direction of translation in step b), wherein during the repeated performance of said steps first and second gaseous fractions of different composition from each other and from feed gas mixture are withdrawn and the feed gas mixture for separation flows into the bed at a region intermediate its end.

For performing this method, GB-A-2174922 proposed an apparatus comprising a column containing a bed of adsorbent capable of selectively adsorbing at least one constituent of the feed gas mixture and having associated wherewith an outlet for a first gaseous fraction spaced apart from an outlet for a second gaseous fraction and an inlet for gas mixture to be separated intermediate the two ends of the column; at least one first reservoir able to be placed in communication with one end of the column by operation of at least one first valve, at least one second reservoir able to be placed in communication with the other end of the column by operation of at least one second valve, and means for extracting gas from one end of the column and passing it to the reservoir associated with that end.

In essence, the thermodynamic pressure swing adsorption (PSA) cycle disclosed in our earlier British Patent, No. GB-A-2174922 utilises pistons at the top and bottom of the bed which in turn increase the pressure in the bed displacing the gas within the bed upwards at constant pressure then decreases the pressure in the bed and displaces the gas downward to a constant pressure. Operating this cycle has the effect of moving the more strongly adsorbed gaseous components in a downwards direction and the least adsorbed components in an upwards direction, consequently the process will separate a two component gas mixture into two useable products.

However, utilising the same pistons to apply the pressure and the displacement is not the most efficient means of ensuring gas adsorption and desorption because as the pressure is increased by the lower piston there will be some displacement of the gas because of the change in volume, and this will be greater at the bottom of the bed than at the top. Similarly on the expansion step the change in volume will also effect the displacement of the gas, this leads to an inefficiency in the process.

SUMMARY OF THE INVENTION

It is an object of the present invention to address the above problems, and to provide a method and apparatus for separating a gas mixture which utilises a continuous PSA cycle of improved thermodynamic efficiency.

Accordingly, the present invention provides, in one aspect, a method of separating a feed gas mixture into a first gaseous fraction and a second gaseous fraction, comprising performing the following steps in repeated sequence:

a) fractionally raising the pressure of a gas mixture which is resident in a bed of adsorbent capable of selectively adsorbing at least one constituent of the feed gas mixture and which comprises the same constituents as said feed gas mixture, and thereby adsorbing said at least one selectively adsorbable constituent;

b) performing a first incremental translation along an axis at approximately constant pressure of the unadsorbed gas in one direction;

c) fractionally reducing the pressure of the gas in the bed and thereby desorbing previously adsorbed gas from the adsorbent;

d) performing a second incremental translation along an axis at approximately constant pressure of the gas in the bed in a direction opposite to the direction of translation in step b), wherein during the repeated performance of said steps first and second gaseous fractions of different composition from each other and from feed gas mixture are withdrawn and the feed gas mixture for separation flows into the bed at a region intermediate its end, and wherein the bed is contained in a vessel having side walls substantially parallel to the axis of translation and two end walls substantially transverse thereto, characterised in that the steps of fractionally raising and reducing the gas pressure in steps a) and c) above are carried out by reciprocation of at least a portion of the side walls of the vessel perpendicularly relative to the axis of translation.

In a second aspect, the invention provides an apparatus for separating a feed gas mixture into a first gaseous fraction and a second gaseous fraction, comprising a vessel having side walls and the end walls containing a bed of adsorbent capable of selectively adsorbing at least one constituent of the feed gas mixture and having associated therewith an outlet of the first gaseous fraction, spaced apart from an outlet for the second gaseous fraction and an inlet for gas mixture to be separated intermediate the two end walls, means being provided:

a) for fractionally raising the pressure of a gas mixture resident in a bed;

b) for performing a first incremental translation along an axis at approximately constant pressure of the unadsorbed gas in one direction;

c) for fractionally reducing the pressure of the gas mixture in the bed, and d) for performing a second incremental translation along an axis at approximately constant pressure of the gas in the bed in the opposite direction to the aforementioned first incremental translation, characterised in that the means for fractionally raising and reducing the pressure of the gas in the bed comprise means for reciprocating at least a part of the side walls of the vessel substantially perpendicularly relative to the axis of translation.

Preferably, the reciprocation is effected by synchronously vibrating separate portions of the vessel side walls, means preferably being provided to control the reciprocation of the respective portions so that they vibrate substantially synchronously.

The incremental translations are most preferably carried out by reciprocating at least part of the end walls of the vessel in a direction substantially parallel to the axis of translation. Suitably, means are provided for controlling this reciprocation so that the end walls vibrate about 180° out of phase with each other.

In a preferred embodiment, the end and side walls comprise diaphragms, or the reciprocating portions, of electromagnetic or electrostatic "loudspeakers". Such loudspeakers, operating at a frequency of between about 0.1 Hz and 100 Hz, and preferably at about 5 Hz, and with an amplitude such as to give an incremental translation of no more than 1 cm, and preferably about 0.5 cm, in the case of the end walls, and to give an overall pressure variation of no more than 1 bar, and preferably about 1 psi, in the case of the side walls (which are well within the operating characteristics of conventional acoustic loudspeakers), suffice to provide the sequential pressure changes and incremental translations to effect the efficient continuous separation of gas (such as oxygen and/or nitrogen from air) in accordance with the general principles described in our GB-A-2174922.

A particular advantage of the method and apparatus of the present invention is that the use of "loudspeakers" operated by electrical impulses enables simple and accurate variations and/or adjustment of frequency and amplitude so as to cope with differences in gas, ambient conditions, adsorbent and the like, and represents a significant advance over the purely mechanical devices employed heretofore.

BRIEF DESCRIPTION OF THE DRAWINGS

The invention will now be described by way of example only and with reference to the accompanying drawings, in which.

DETAILED DESCRIPTION

Figure 1:
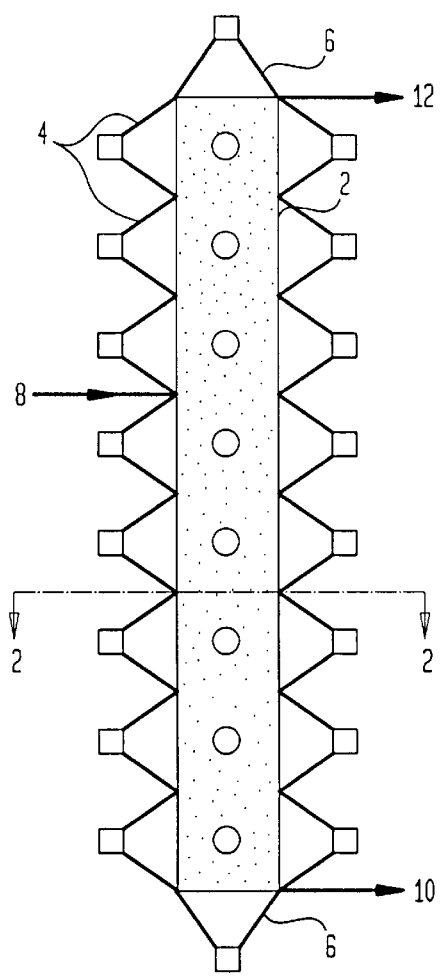
FIG. 1 is a schematic side elevation of an embodiment of a gas separation apparatus in accordance with the invention.
Figure 2:
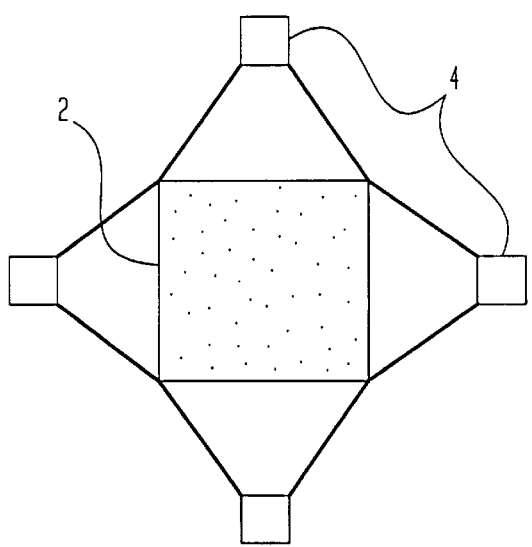
FIG. 2 is a cross sectional view, along AA, of the apparatus of FIG. 1.

FIGS. 1 and 2 of the drawings show a plant for the separation of air including a column 2 (which is illustrated in the form of a square column, but which would preferably be cylindrical) constructed as a pressure vessel and containing a bed of carbon molecular sieve capable of preferentially adsorbing oxygen from a gas mixture comprising oxygen and nitrogen. The bed occupies substantially the whole internal volume of the column 2. Substantially all of the side and end walls of the column 2 are reciprocal, being formed by the diaphragms of electrically operated reciprocators (shown here schematically as electromagnetic acoustic loudspeakers) 4 and 6, respectively. The column is also provided with an inlet for compressed and dried air to be separated. Such air is supplied from a reservoir 8.

The bottom end of the column 2 is connected via a conduit to a reservoir 10 for receiving oxygen-rich gas, and the top end of the column 2 is connected via a conduit to a second reservoir 12 for receiving nitrogen-rich gas. For the operation of the apparatus shown in FIGS. 1 and 2, valves, compressors, pressure vessels and the like (not shown) are provided, as is well known to those skilled in the art, and as is particularly set out in detail in our British Patent No. GB-A-2174922. For example, means such as a pump or a Rootes blower are provided for extracting gas from the gas outlet(s), the or each of which are ideally disposed adjacent the end walls of the cylindrical column.

The operation of the apparatus illustrated in the Figures is also as set out in GB-A-2174922. That is to say, the pressure of the gas within the column 2 is alternately fractionally raised and lowered by reciprocation of the loudspeakers 4, whilst loudspeakers 6 provide incremental translation of the gas within the bed, so as to provide a net upward flow of nitrogen molecules in the void spaces of the bed, and ultimately out of the column to reservoir 12, whilst there is a net downward flow of oxygen molecules, out of the bed to reservoir 10.

The incremental translations are performed by the loudspeaker 6 vibrating approximately 180° out of phase with one another so as to provide successive upward and downward displacements of the gas within the column 2 in conditions which are as near as possible isobaric. For a more detailed description of the separation process, the reader is directed to GB-A-2174922.

The advantage of the apparatus illustrated in FIGS. 1 and 2 is, we suggest, due to the fact that the smaller the changes in pressure and the incremental translations in the method set out in our earlier British Patent Application (No. GB-A-2174922) the more efficient is the separation, but the lower the yield per cycle. Acoustic loudspeaker technology allows both the frequencies and amplitudes of reciprocation/vibration necessary to achieve an efficient, continuous PSA process. Furthermore, apparatus in accordance with the invention has considerable other advantages over conventional devices employing piston compressors: the apparatus is much easier to implement, requiring only conventional loudspeakers, amplifiers and wave generators, all well-known in the acoustic field; the apparatus is versatile, as it can easily be "tuned" so as to accommodate phase shifts and wave amplitude (which are extremely difficult to achieve with conventional devices) as may be necessary for particular separation processes, and a wide range of wave shapes are possible (which is not available from conventional mechanical devices).

Having described the principles of the invention, numerous modifications and improvements will be immediately apparent to those skilled in the art. For example, it is well-known that it is possible to recover electrical energy from a fixed-coil loudspeaker which is moved by pressure variations; the loudspeakers of the present invention could serve as "reversible electrical machines", converting electrical energy into pressure variations and/or vice versa. And, if several loudspeakers were operated in parallel, energy recovered by one could be utilised by the others, thus enhancing overall energy efficiency. Also, although electromagnetic loudspeakers have been shown in the drawings, other types of loudspeaker could be used (electrostatic or piezo-electric, for example), and the control means provided (not shown) for ensuring that loudspeakers 4 vibrate synchronously, and loudspeakers 6 180° out of phase, may be adapted to vary the various phase relationships to suit certain applications, or to accommodate variations in the operating conditions. Minor variation of the amplitude of vibration of the loudspeakers 4 and/or 6 may also have a beneficial effect on the practical efficiency of the method and apparatus of the invention, and it may even be that music of relatively low frequency (such as is so prevalent in much contemporary popular beat music as enjoyed by the young people of today) could be played on loudspeakers 4, 6 to improve the yield. Moreover, although described in relation to the separation of oxygen and nitrogen from air, the present invention is equally applicable to the separation by PSA of other gases from other gas mixtures. The present invention is also not limited to PSA processes but can be used in essentially all Stirling-based cycles, such as thermally coupled PSA; the "loudspeakers" can replace conventional piston pumps, but with broadly and accurately variable wave frequency, amplitude and shape, thus enabling cheap and easy process performance optimisation.

We claim:

1. A method of separating a feed gas mixture containing at least one selectively adsorbable constituent into a first gaseous fraction and a second gaseous fraction, comprising:

performing the following steps in repeated sequence:
   a) fractionally raising the pressure of a gas mixture resident, within a bed of adsorbent capable of selectively adsorbing at least one constituent of the feed gas mixture, the gas mixture comprising the same constituents as said feed gas mixture, and the adsorbent adsorbing said at least one selectively adsorbable constituent;
   b) performing a first incremental translation along an axis, at approximately constant pressure of the unadsorbed gas, in one direction;
   c) fractionally reducing the pressure of the gas in the adsorbent bed, thereby to desorb previously adsorbed gas from the adsorbent;
   d) performing a second incremental translation along said axis, at approximately constant pressure of the gas in the bed, in a direction opposite to the direction of translation in step b);

withdrawing said first and second gaseous fractions; and the feed gas mixture for separation being introduced into the bed of adsorbent at a region intermediate its end; and the bed of adsorbent being contained in a vessel having side walls substantially parallel to the axis of translation and two end walls substantially traverse thereto;

the steps of fractionally raising and reducing the gas pressure in steps a) and c) being carried out by reciprocation of at least a portion of the side walls of the vessel perpendicularly relative to the axis of translation.

2. The method as claimed in claim 1 wherein the reciprocation is effected by synchronously vibrating separate portions of the side walls of the vessel.

3. The method as claimed in claim 1 or claim 2 characterised in that the incremental translations of steps b) and d) above are effected by reciprocating the end walls of the vessel in a direction substantially parallel to the axis of translation.

4. The method as claimed in claim 3 wherein said reciprocating of the end walls is effected by vibrating the end walls 180° out of phase with each other.

5. The method of claim 4 wherein said reciprocating of the end walls is at a frequency of about 5 Hz.

6. The method as claimed in claim 3 wherein said reciprocating of the end walls is at a frequency of about 5 Hz.

7. The method as claimed in claim 1 in which the feed gas mixture is air from which water vapour and carbon dioxide has been removed.

8. The method as claimed in claim 1 in which each increment of gas admitted to the bed is on average subjected to at least 10 operating cycles.

9. An apparatus for separating a feed gas mixture into a first gaseous fraction and a second gaseous fraction, comprising:

a vessel having side walls and end walls containing a bed of adsorbent capable of selectively adsorbing at least one constituent of said feed gas mixture and having associated therewith an outlet for said first gaseous fraction, spaced apart from an outlet for said second gaseous fraction and an inlet for gas mixture to be separated intermediate said end walls;

means for fractionally raising the pressure of a gas mixture resident in a bed;

means for performing a first incremental translation along an axis at approximately constant pressure of the unadsorbed gas in one direction;

means for fractionally reducing the pressure of the gas mixture in the bed; and means for performing a second incremental translation along an axis at approximately constant pressure of the gas in the bed in the opposite direction to the aforementioned first incremental translation;

the means for fractionally raising and reducing the pressure of the gas in the bed comprising means for reciprocating at least a part of the side walls of the vessel substantially perpendicularly relative to the axis of translation.

10. The apparatus as claimed in claim 9 wherein the vessel side walls comprise a plurality of separate sections, each section being provided with reciprocating means, means being provided for controlling the reciprocation of the sections so that they reciprocate substantially synchronously.

11. The apparatus as claimed in claim 9 or claim 10 wherein the means for performing the first and second incremental translations comprise means for reciprocating at least a part of the end walls in a direction substantially parallel to the axis of translation.

12. The apparatus as claimed in claim 11 further comprising means for controlling the phase relationship of the reciprocation of the end walls.

13. The apparatus as claimed in claim 9 further comprising means for controlling the amplitude of reciprocation of the or each reciprocating means.

14. The apparatus claimed in claim 9 wherein the vessel is substantially cylindrical, the curved side walls thereof being parallel to the axis of translation and the two end walls thereof being transverse thereto.

* * * * *